United States Patent [19]

Drexler et al.

[11] Patent Number: 4,545,617

[45] Date of Patent: Oct. 8, 1985

[54] SAFETY AUTOCAR CHAIR FOR CHILDREN

[76] Inventors: Joannes H. Drexler, Postbus 18, 6980 AA Doesburg; Wolfram J. P. Peters, Laan van Overvest 20, 2613 Delft, both of Netherlands

[21] Appl. No.: 528,518

[22] Filed: Sep. 1, 1983

[30] Foreign Application Priority Data

Oct. 8, 1982 [EP] European Pat. Off. ........ 82201259.7

[51] Int. Cl.⁴ ............................................. B60N 1/12
[52] U.S. Cl. ................................... 297/340; 297/320; 297/342
[58] Field of Search ................. 297/68, 320, 321, 340, 297/341, 342, 316

[56] References Cited

U.S. PATENT DOCUMENTS

| | | | |
|---|---|---|---|
| 2,679,285 | 5/1954 | Luckhardt | 297/321 |
| 2,809,689 | 10/1957 | Garvey et al. | 297/341 |
| 4,071,275 | 1/1978 | Rogers, Jr. | 297/85 |
| 4,205,877 | 6/1980 | Ettridge | 297/321 |

FOREIGN PATENT DOCUMENTS

| | | | |
|---|---|---|---|
| 154892 | 1/1954 | Australia | 297/320 |
| 594389 | 6/1959 | Italy | 297/342 |

Primary Examiner—William E. Lyddane
Assistant Examiner—Peter R. Brown
Attorney, Agent, or Firm—Murray Schaffer

[57] ABSTRACT

The safety chair for children according to the invention is adjustable in two positions, giving the child a sitting and a recumbent position, respectively.

The seat and the back of the chair are mutually pivotally connected and the seat is adjustably connected to a horizontal base frame part, the back being pivotally connected to upstanding portions of said base frame. Preferably the seat and the base frame are mutually connected by a lever mechanism according to the crank shaft principle. An actuating lever extends sideways from the chair.

4 Claims, 3 Drawing Figures

SAFETY AUTOCAR CHAIR FOR CHILDREN

The invention relates to a safety chair for children, adapted to be positioned on the back seat of an autocar, especially for the age of 9 months to 3.5 years.

Such chairs are known in different constructions. They may be classified in two categories namely those having such shape and position of the chair, that the child has a fixed, usually sitting position, and those in which the child may be positioned in a sitting or recumbent attitude.

The invention aims at providing a chair which is adapted to be positioned as well in the recumbent as in the sitting position and that of course satisfies the conditions in this area, the ECE 44 regulations.

This is achieved according to the invention in that the chair comprises a seat and a back which parts are pivotably mutually connected, and a base frame, having a horizontal portion to which the seat is connected and is adjustable relative thereto at least into a forward and a rear position, said base frame having at the rear of the horizontal portion upstanding side portions, to the upper ends of which the back is pivotally connected.

The positions of the seat should be lockable after it has been adjusted. Although the seat could be slidable along a guideway, the most favourable and cheapest solution is obtained if parallel to the axes of the pivot connections a rod is pivotably journalled in the base frame, a crank projecting from that rod and being secured thereto, said crank being connected with its free end pivotally to the lower side of the seat, said rod carrying outside the frame an actuating lever.

Thereby the extreme positions are automatically locked since in said positions the crank end connected to the seat is situated in the lowest points of the crank path and the crank together with the back between those pivot points thereof constitutes a toggle lever mechanism, which in said extreme positions has been moved past its straight line condition. The actuating lever is easily actuatable by moving it into the both positions.

In order to rigidify the construction it is preferable that the upstanding side portions of the base frame are mutually connected by a tube. Said tube may serve simultaneously for the connection of a safety belt to be used together with the chair and may absorb through deformation part of the energy to be wasted when a collision occurs.

The invention will be hereunder illustrated with reference to the drawing in which an embodiment of the chair according to the invention, given as an example, is shown.

Figure 1:
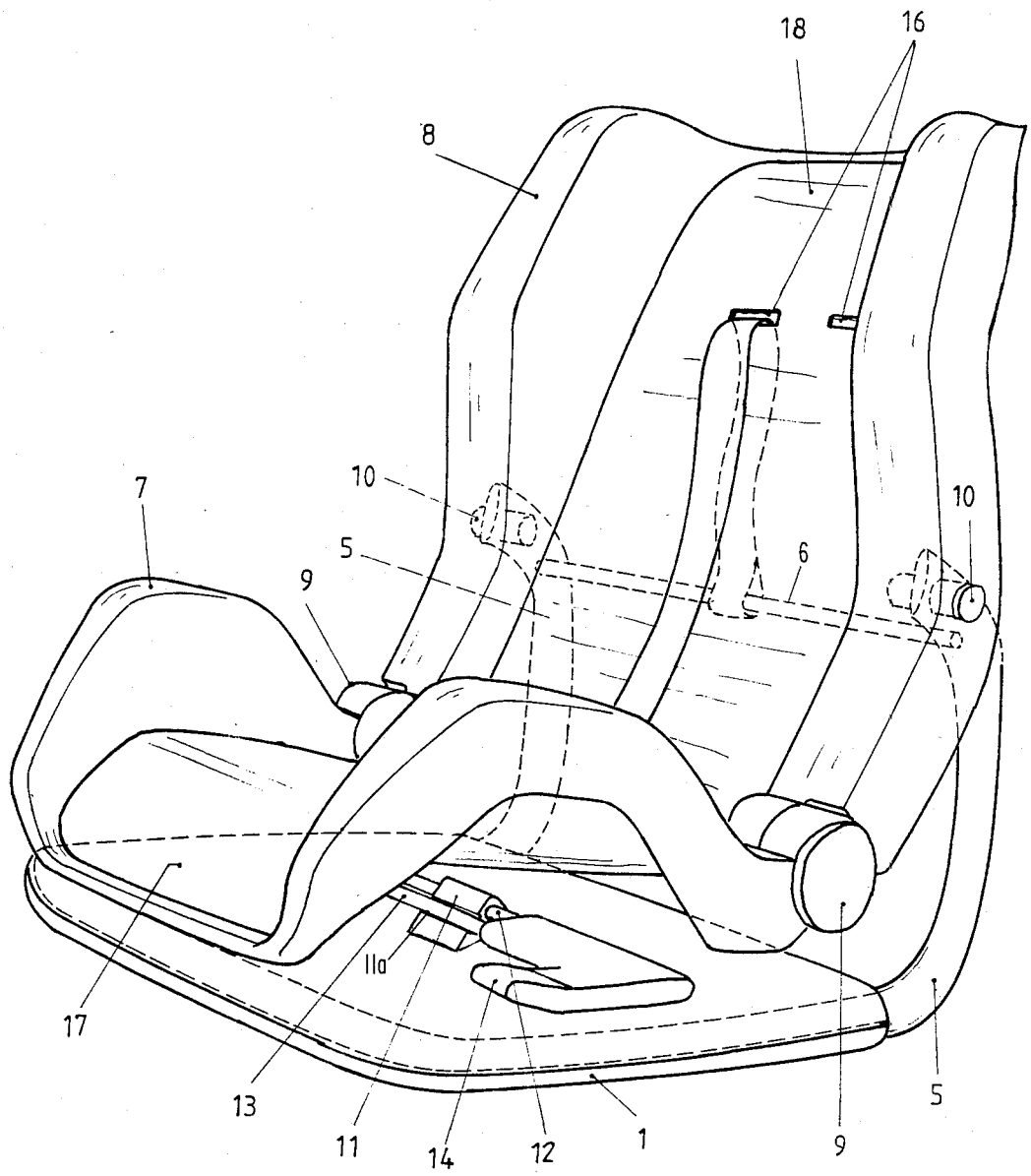
FIG. 1 is a perspective view of the chair.

The chair as shown comprises a base frame 1, which is mainly shaped as a platform. In the chair according to the drawing, the platform comprises two superposed portions 2, 3, manufactured from plastic material, interiorly reenforced by webs (not shown), said portions being held together by screw fasteners, by welding or by adhesive, while enclosing a metal tube 4, as shown in broken lines in FIG. 3, said tube extending along the side edges and the front edge of the frame 1. Said tube merges at both rear ends of the frame 1 with upstanding portions 5, which at the back of the chair are mutually connected by a thinner horizontal tube 6, indicated by broken lines.

The chair proper comprises a seat 7 and a back 8, which parts are mutually connected through pivot connections 9. Somewhere between the lower end and the upper end of the back it is pivotally connected by pivot connections 10 to the upper ends of the upstanding portions 5 of the frame tube 4.

The seat as well as the back are formed in the embodiment as shown dish-shaped from a plastic material, e.g. a modified poly-propylene.

Figure 2:
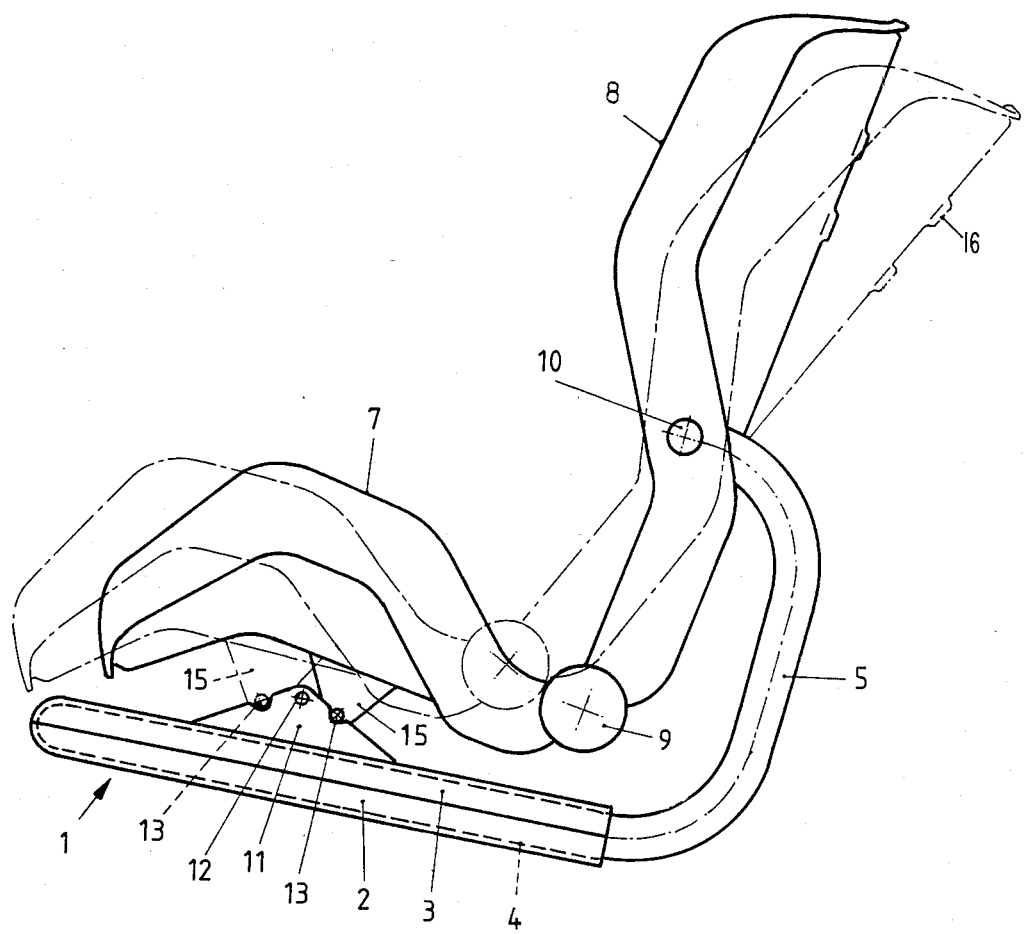
FIG. 2 is a schematic side view showing both positions of the chair.
Figure 3:
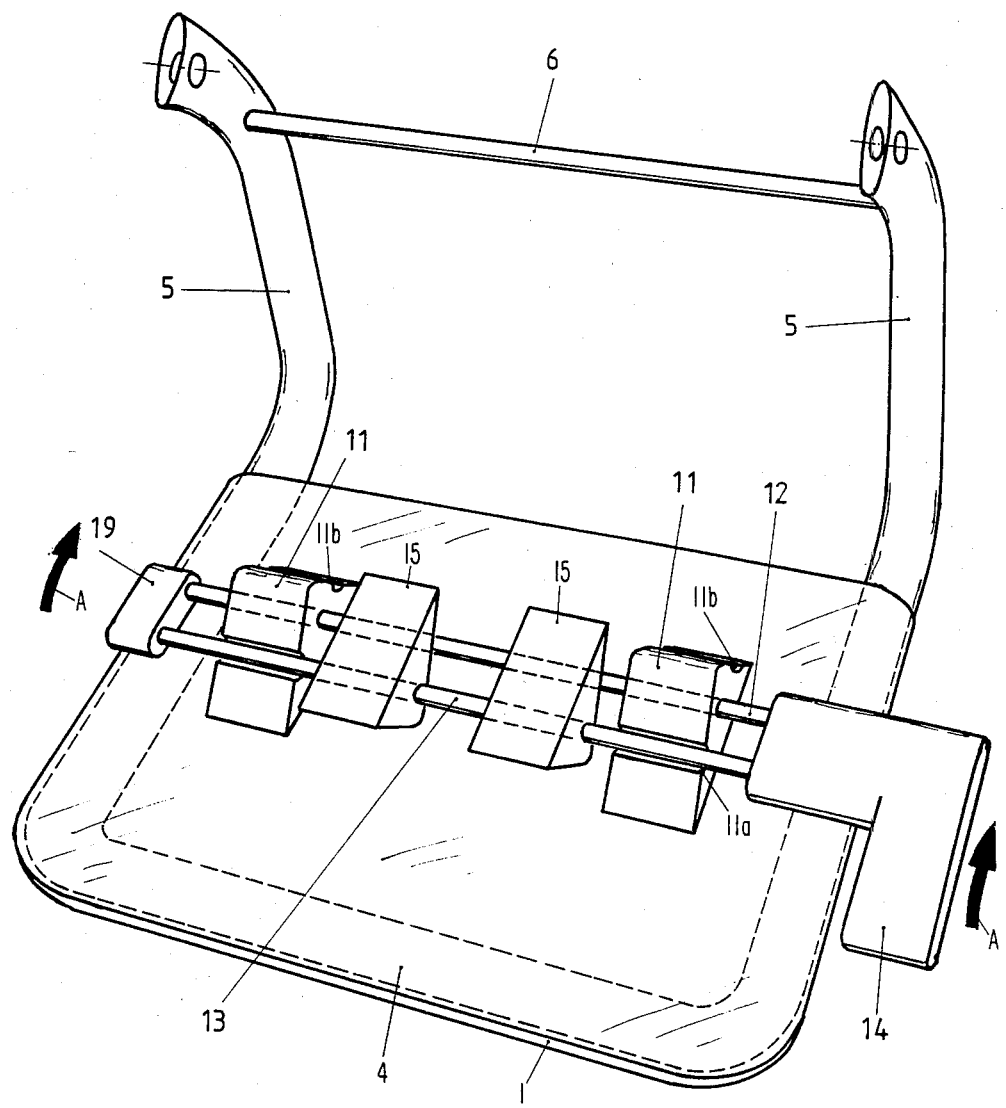
FIG. 3 is a perspective view of the base frame, having the crank.

It appears from FIG. 3 that embossments 11 have been provided on the upper surface of the frame platform 1, in this case when molding the platform, said embossments serving as journals for a rod 12. It appears from FIGS. 2 and 3 that two bearing supports 15 have been provided, which serve as journals for a rod 13. The rods 12 and 13 are at one end connected to an actuating lever 14 and at the other end mutually connected through a coupling piece 19. The system of the rods 12 and 13, the pivot points and journal points 11 and 15 and the parts 14 and 19 constitute together a lever mechanism according to the crank shaft principle.

If now the actuating lever 14 is moved through an arc of somewhat in excess of 180°, the rod 13 is moved from the position indicated in FIG. 2 by full lines to the forward position indicated by broken lines. In the forward position the chair has the recumbent position and in the rear position the sitting position. As said therewith, the rod 13 moves through an arc somewhat in excess of 180° whereby, as appears from FIG. 2, the extreme positions of the rod 13 are on a lower level than the rod 12. Thereby the chair is automatically locked in its both positions.

Further the chair is provided with slots (not shown) at both sides, adjacent the lower edge of the back 8 and with slots adjacent the back edge of the seat 7, for threading a children's safety belt to be used together with the chair, said belt not being shown. About half way between the length of the back between its upper edge and the pivots 10, two slots 16 have been shown. One of said slots serves for threading the diagonal portion of the belt, the end of which is thereafter secured to the rod 6 at the rear side of the back 8.

The seat 7 and the back 8 of the chair may be upholstered with a textile fabric, said coverings 17 and 18 being made e.g. from ribcord, stuffed with foam material and secured, preferably releasable, to the seat 7 and the back 8. This may be preferably done through the use of the known Velcro strip material. Thereby the coverings may be easily removed, washed and reset.

As said above, it would also be feasable to connect a slide with the lower seat surface in replacement of the actuating lever 12, 13, said slide being slidable in a guide way, which is secured to the base, the slide then being reciprocatable by means of a handle. In that case blocking means for the slide have to be provided.

The method of mounting as shown, with the aid of the actuating rod, 12, 13, provides the cheapest construction.

As said, the rod 10 at the rear side of the back may serve as an energy damper if the end of the shoulder portion of the safety belt is connected therewith. When a collision occurs a large force is imparted to the belt and in that case the rod 10 may absorb part of the collision energy by deforming under the influence of said force.

A second set of slots 16 is provided below the slots 16 as shown in the back, in order to be used during the youngest age period of the child.

The safety chair for children according to the invention may receive a child as well in a recumbent as in a sitting position and may be very easily adjusted from one position to the other by moving the actuating lever 14, if necessary by the car driver from the front seat.

We claim:

1. A child's safety chair adjustable into a sitting and reclining position comprising a seat and a back pivotally connected end to end with each other, a horizontal base having a pair of spaced parallel arms extending upwardly and rearwardly therefrom, means pivotally connecting said back to said upstanding arms parallel the axis of the pivotal connection between the seat and back, first and second boss means secured to each of said seat and base respectively, first pivot means journalled in said first boss means along an axis parallel to the axis of the pivotal connection between the seat and back, second pivot means journalled in said second boss means parallel to said first pivot means said first and second pivot means being coupled together for conjoint rotation, whereby said first pivot means is movable arcuately about said second pivot means thereby causing lifting and shifting of said seat and back between a reclining and a sitting position.

2. The safety seat according to claim 1, wherein said first and second pivot means comprise rods journalled in said respective bosses parallel to the axis of the pivotal connection between the seat and back, the ends of said rods being fixedly coupled, one end being provided with a lever for rotating said rods.

3. The safety chair according to claim 2, including a tubular connection between the spaced parallel arms.

4. The safety chair according to claim 3, including a safety belt, at least a portion of which is secured to said tubular connection.

* * * * *